(12) United States Patent
Su et al.

(10) Patent No.: US 8,837,371 B2
(45) Date of Patent: Sep. 16, 2014

(54) METHOD OF AND APPARATUS FOR MAPPING TO DEMODULATION REFERENCE SIGNAL PORT

(75) Inventors: Xin Su, Beijing (CN); Deshan Miao, Beijing (CN); Rakesh Tamrakar, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 94 days.

(21) Appl. No.: 13/578,335

(22) PCT Filed: Jan. 31, 2011

(86) PCT No.: PCT/CN2011/000191
§ 371 (c)(1),
(2), (4) Date: Aug. 10, 2012

(87) PCT Pub. No.: WO2011/097951
PCT Pub. Date: Aug. 18, 2011

(65) Prior Publication Data
US 2012/0300709 A1    Nov. 29, 2012

(30) Foreign Application Priority Data

Feb. 11, 2010    (CN) .......................... 2010 1 0112140

(51) Int. Cl.
*H04W 4/00*    (2009.01)
*H04L 5/00*    (2006.01)
(52) U.S. Cl.
CPC ............ *H04L 5/0037* (2013.01); *H04L 5/0058* (2013.01); *H04L 5/0051* (2013.01); *H04L 5/0026* (2013.01)
USPC ........................................ 370/328

(58) Field of Classification Search
USPC ................. 370/254, 276, 328, 329, 464, 431; 375/219, 295, 316
See application file for complete search history.

(56) References Cited

U.S. PATENT DOCUMENTS

2010/0002790 A1    1/2010   Onggosanusi et al.
2010/0080154 A1*   4/2010   Noh et al. ..................... 370/310
(Continued)

FOREIGN PATENT DOCUMENTS

CN    101374006 A    2/2009
CN    101572685 A    11/2009

OTHER PUBLICATIONS

InterDigital Communications Corporation et al., "Summary of Uplink SU-MIMO Using Precoding", 3GPP TSG-RAN WG1 Meeting #47 R1-063464, Nov. 10, 2006, pp. 1-16.*

*Primary Examiner* — Paul H Masur
*Assistant Examiner* — Michael Phillips
(74) *Attorney, Agent, or Firm* — Kilpatrick Townsend & Stockton LLP (57) ABSTRACT

A demodulation reference signal port mapping method is disclosed. The method includes: a base station communicates with a User Equipment (UE), and allocates corresponding data stream to the UE according to the attribution of the UE; the base station maps the corresponding data stream from a layer to a corresponding demodulation reference signal port; the base station transmits the corresponding data stream to the UE via demodulation reference signal port. By restricting the demodulation reference signal port mapping solution of rank=1 to rank=8 and the demodulation reference signal port mapping solution when the retransmission occurs, the technical solution enables the demodulation reference signal port mapping solution to be compatible with the present system and to keep lower overhead of the demodulation reference signal.

16 Claims, 9 Drawing Sheets

S401: A base station determines an attribute of a UE and assigns the UE with a corresponding data stream S402: The base station maps the corresponding data stream from a layer to a corresponding demodulation reference signal port S403: The base station transmits data to the UE via the demodulation reference signal port (56) References Cited

U.S. PATENT DOCUMENTS

| | | | |
|---|---|---|---|
| 2010/0195594 A1* | 8/2010 | Seo et al. | 370/329 |
| 2010/0195615 A1* | 8/2010 | Lee et al. | 370/330 |
| 2010/0303034 A1* | 12/2010 | Chen et al. | 370/329 |
| 2011/0141982 A1* | 6/2011 | Zhang et al. | 370/329 |
| 2011/0158191 A1* | 6/2011 | Zhang et al. | 370/329 |
| 2011/0228722 A1* | 9/2011 | Noh et al. | 370/315 |
| 2011/0243066 A1* | 10/2011 | Nayeb Nazar et al. | 370/328 |
| 2012/0008577 A1* | 1/2012 | Han et al. | 370/329 |
| 2012/0020323 A1* | 1/2012 | Noh et al. | 370/330 |
| 2012/0033643 A1* | 2/2012 | Noh et al. | 370/335 |
| 2012/0039287 A1* | 2/2012 | Ko et al. | 370/329 |
| 2012/0093120 A1* | 4/2012 | Ko et al. | 370/329 |
| 2012/0213147 A1* | 8/2012 | Noh et al. | 370/315 |
| 2012/0220327 A1* | 8/2012 | Lee et al. | 455/509 |
| 2012/0224555 A1* | 9/2012 | Lee et al. | 370/329 |
| 2012/0300728 A1* | 11/2012 | Lee et al. | 370/329 |
| 2013/0021991 A1* | 1/2013 | Ko et al. | 370/329 |
| 2013/0279466 A9* | 10/2013 | Lee et al. | 370/330 |
| 2013/0301554 A1* | 11/2013 | Nam et al. | 370/329 |
| 2014/0119279 A1* | 5/2014 | Han et al. | 370/329 |

* cited by examiner

Fig.1
--Prior Art--

CDM group 1: 2 layers
CDM group 2: 2 layers

Fig.2-1
--Prior Art--

CDM group 1: at most 4 layers
CDM group 2: at most 4 layers

METHOD OF AND APPARATUS FOR MAPPING TO DEMODULATION REFERENCE SIGNAL PORT

The present application is a US National Stage of International Application No. PCT/CN2011/000191, filed 31 Jan. 2011, designating the United States, and claiming priority to Chinese Patent Application No. 201010112140.X filed 11 Feb. 2010.

FIELD OF THE INVENTION

The present invention relates to the field of digital communications, and more particularly, the invention relates to a method of and apparatus for mapping to a demodulation reference signal port.

BACKGROUND OF THE INVENTION

Mobility and a broadband have become development trends of modern communication technologies, and the 3$^{rd}$ Generation Partnership Project (3GPP) devotes itself to evolution of a Long Term Evolution (LTE) system as a 3G system and aims to evolve 3GPP radio access technologies toward high-data-rate, low-delay and optimized packet data applications.

For a higher peak rate, Single User Multi-Input Multi-Output (SU-MIMO) of Long Term Evolution Advanced (LTE-A) can support parallel transmission of at most 8 data layers. In order to support a flexible spatial pre-processing technology, a Demodulation Reference signal (DMRS)-based transmission scheme will be adopted over an LTE-A downlink.

During downlink MIMO transmission, an evolved NodeB (eNB) will assign each scheduled UE with a specific number of parallel data streams dependent upon a channel condition, a service characteristic, a priority and other factors of each UE, where each data stream is referred to as a layer. In order to support the Spatial Multiplexing technology of at most 8 layers, an 8-port DMRS will be defined in the LTE-A. The DMRS is processed with the same pre-coding as data, and the UE can know an equivalent channel matrix after pre-coding and demodulate the data by measuring the DMRS. The downlink SU-MIMO of the LTE-A can support at most 8 layers, each of which corresponds to a DMRS port. A process flow of a downlink physical channel is as illustrated in FIG. 1.

Figure 1:
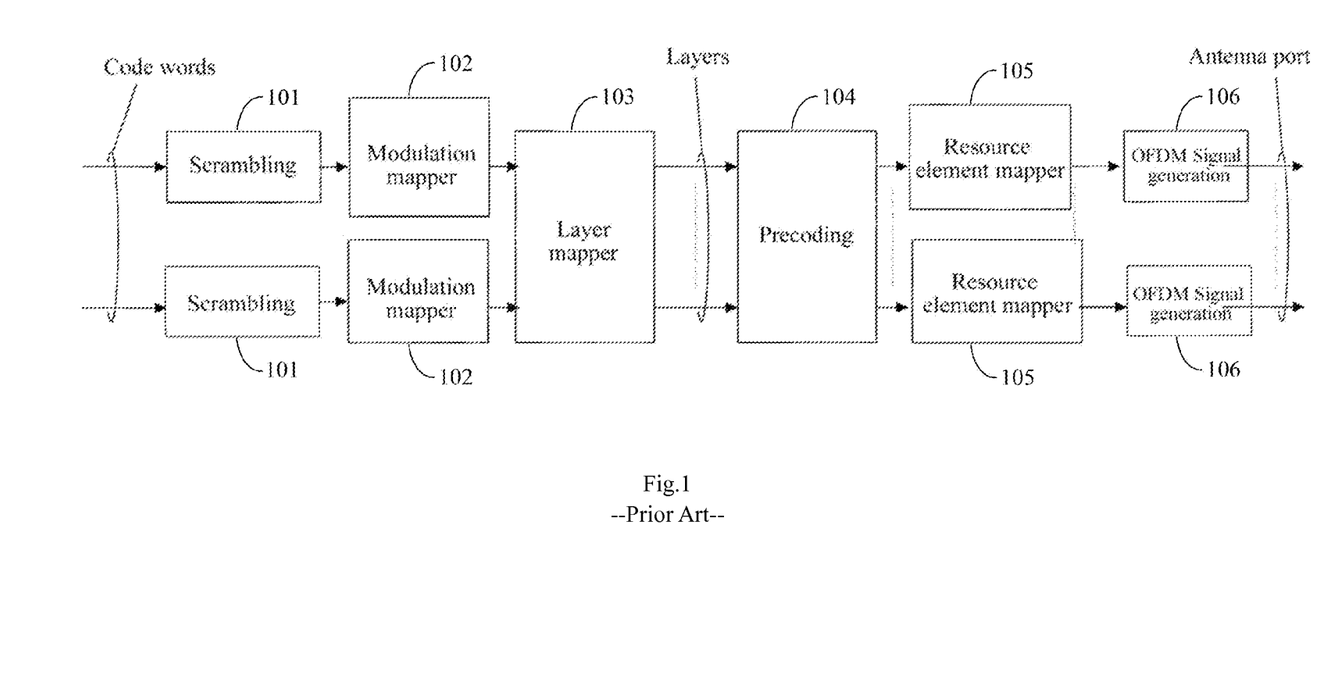
FIG. 1 is a process flow chart of a downlink physical channel in the prior art.

As illustrated in FIG. 1, downlink data transmission of each UE can support at most 2 codewords, each of which corresponds to a Transport Block (TB), and a Modulation and Coding Scheme (MCS) of each codeword can be controlled by an eNB dependent upon a link condition. The eNB will further determine the number of data streams to be used for parallel transmission dependent upon a spatial characteristic of a channel, a service type, a priority, the amount of traffic and other factors. Transmission of at most 8 layers can be supported in the LTE-A. A codeword-to-layer mapping relationship is defined by a layer mapper module, and at present an agreement has been reached upon definition of layer mapper function in spatially multiplexed transmission, where specific layer mapper functions are as depicted in Table 1 and Table 2.

TABLE 1

| Codeword-to-layer mapping (Rank = 1-4) | | | |
|---|---|---|---|
| The number of layers | The number of codewords | Codeword-to-layer mapping $i = 0, 1, \ldots, M_{symb}^{layer} - 1$ | |
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

TABLE 2

| Codeword-to-layer mapping (Rank = 5-8 and mapping of single-codeword to layers 3-4) | | | |
|---|---|---|---|
| The number of layers | The number of codewords | Codeword-to-layer mapping $i = 0, 1, \ldots, M_{symb}^{layer} - 1$ | |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |

TABLE 2-continued

Codeword-to-layer mapping (Rank = 5-8 and mapping of single-codeword to layers 3-4)

| The number of layers | The number of codewords | Codeword-to-layer mapping $i = 0, 1, \ldots, M_{symb}^{layer} - 1$ | |
|---|---|---|---|
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

For public pilot-based transmission and demodulation schemes in the Rel-8/Rel-9, a pre-coding module performs pre-coding based upon a Pre-coding Matrix Indicator (PMI). For the DMRS-based transmission scheme, the pre-coding module functions to map respective data layers to DMRS ports. In the transmission mode 7 of the Rel-8, layer-to-port mapping is just simple one-to-one mapping because there is only one dedicated pilot, the port 5. In the transmission mode 8 of the Rel-9, two dedicated pilots, the port 7 and the port 8, are defined, and a layer-to-port mapping scheme is defined as $$\begin{bmatrix} y^{(7)}(i) \\ y^{(8)}(i) \end{bmatrix} = \begin{bmatrix} x^{(0)}(i) \\ x^{(1)}(i) \end{bmatrix}.$$

Figure 21:
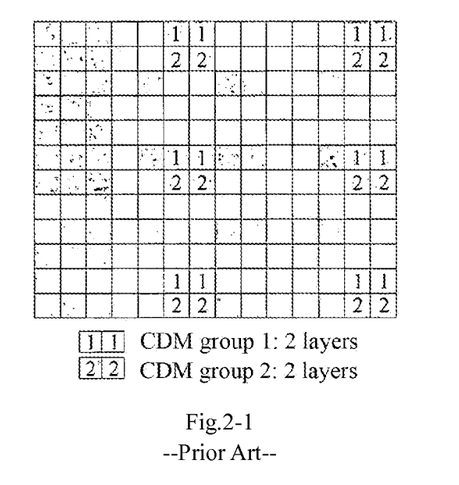
Figure 22:
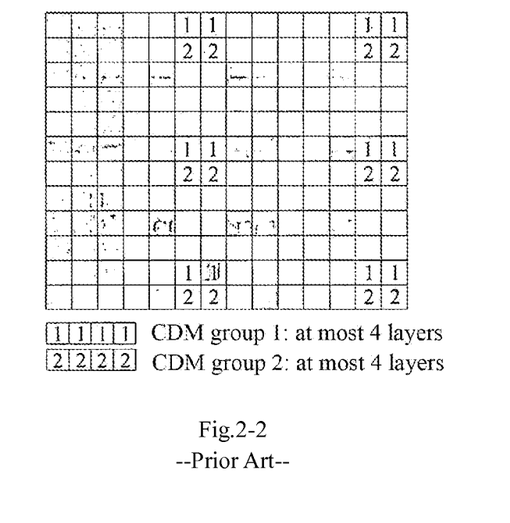

A DMRS of at most 8 ports is supported in the LTE-A, and FIG. 2-1 illustrates DMRS patterns at the ranks=1-4 as already determined at present in the LTE-A. DRMS patterns at the ranks 5-8 are under ongoing discussion, but substantially it can be determined that in the DMRS patterns at the ranks 5-8, respective DMRS ports will be multiplexed in a Code Division Multiplexing-Frequency Division Multiplexing scheme. FIG. 2-2 illustrates an example of the DMRS patterns at the ranks=5-8.

Figure 3:
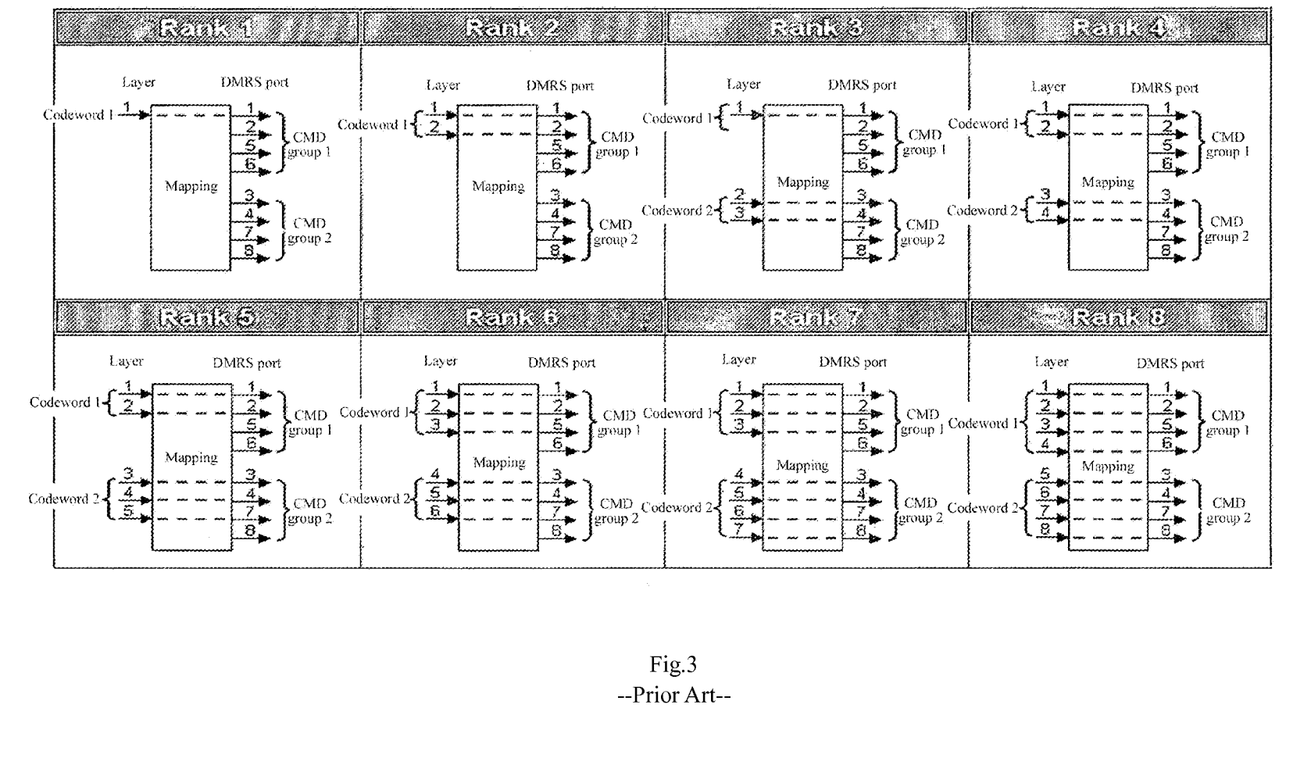
FIG. 3 is a schematic diagram of a layer-to-DMRS port mapping relationship in the prior art.

As opposed to the Rel-8/Rel-9, the layer-to-port mapping relationship in the LTE-A is relatively complex in that both a scheme of allocating layers corresponding to respective codewords across respective CDM groups and a relationship between a DMRS pattern and a rate matching module during retransmission have to be taken into account. The method illustrated in FIG. 3 can be adopted at present for the issue of layer-to-port mapping in the LTE-A. Under a mapping principle thereof, layers corresponding to different codewords have to be mapped into different CDM groups.

However the foregoing mapping solution has the following drawbacks:

(1) At the rank=2, two codewords have to be mapped respectively into different CDM groups under the mapping rule thereof, and this mapping scheme is incompatible with the transmission mode 8 of the Rel-9, so it is inconvenient to schedule an Rel-9 UE and an Rel-10 UE jointly;

(2) At the rank=2, two codewords have to be mapped respectively into different CDM groups, and therefore a DMRS overhead is increased from 12 pairs of Resource Elements (REs)/Physical Resource Blocks (PRBs) to 24 pairs of REs/PRBs;

(3) If it is ensured under the principle of the existing solution that a layer corresponding to each codeword can only be put into one CDM group with a DRMS overhead of 12 pairs of REs/PRBs, then only transmission of a single codeword can be supported in transmission at the rank=2; and (4) No method of port mapping in retransmission has been considered in the existing solution.

Therefore it is desired to propose a working solution to mapping to a demodulation reference signal port while being compatible with an existing system and keeping a lower demodulation reference signal overhead.

SUMMARY OF THE INVENTION

An object of the invention is to address at least one of the foregoing drawbacks in the prior art, particularly by defining a solution to mapping to a demodulation reference signal port at the rank=1 to the rank=8 and a solution to mapping to a demodulation reference signal port in retransmission, so that the solutions to mapping to a demodulation reference signal port can be compatible with an existing system while keeping a lower demodulation reference signal overhead.

In order to attain the foregoing object, an aspect of embodiments of the invention discloses a method of mapping to a demodulation reference signal port, which includes the steps of:

a base station assigning a User Equipment, UE, with a corresponding data stream dependent upon an attribute of the UE; the base station mapping the corresponding data stream from a layer to a corresponding demodulation reference signal port; and the base station transmitting the corresponding data stream to the UE via the demodulation reference signal port.

Another aspect of the embodiments of the invention further discloses a base station including a transceiver module and a mapping module, wherein:

the transceiver module is configured to assign a User Equipment, UE, with a corresponding data stream dependent upon an attribute of the UE; the mapping module is configured to map the corresponding data stream from a layer to a corresponding demodulation reference signal port; and the transceiver module is further configured to transmit the corresponding data stream to the UE via the demodulation reference signal port.

The foregoing solutions proposed by the invention define a solution to mapping to a demodulation reference signal port at the rank=1 to the rank=8, and a solution to mapping to a demodulation reference signal port in retransmission, so that the solutions to mapping to a demodulation reference signal port can be compatible with an existing system while keeping a lower demodulation reference signal overhead. Furthermore the foregoing solutions proposed by the invention make minor modification to the existing system without any influence upon continual evolvement of the system and can be simple and efficient to implement.

Additional aspects and advantages of the invention will be partly given in the following description, become partly apparent in the following description or be learned from practicing of the invention.

BRIEF DESCRIPTION OF THE DRAWINGS

The foregoing and/or additional aspects and advantages of the invention will become apparent and readily understood in the following description of the embodiments with reference to the drawings in which:

FIG. 2-1 illustrates a schematic diagram of DRMS patterns at the ranks=1-4 in the LTE-A in the prior art;

FIG. 2-2 illustrates a schematic diagram of DRMS patterns at the ranks=5-8 in the LTE-A in the prior art;

DETAILED DESCRIPTION OF THE EMBODIMENTS

Embodiments of the invention will be described below in details, and examples of the embodiments will be illustrated in the drawings throughout which identical or similar reference numerals denote identical or similar elements or elements with identical or similar functions. The embodiments to be described below with reference to the drawings are illustrative and intended to just explain the invention but can not be construed as limiting the invention.

In order to attain the object of the invention, an embodiment of the invention discloses a method of mapping to a demodulation reference signal port, which includes the following steps:

A base station assigns a UE with a corresponding data stream dependent upon an attribute of the UE; the base station maps the corresponding data stream from a layer to a corresponding demodulation reference signal port; and the base station transmits the corresponding data stream to the UE via the demodulation reference signal port.

Figure 4:
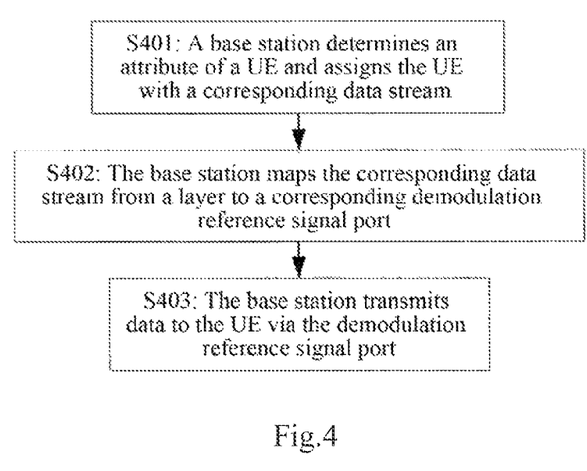
FIG. 4 is a flow chart of a method of mapping to a DMRS port according to an embodiment of the invention.

As illustrated in FIG. 4 which is a flow chart of a method of mapping to a DMRS port according to an embodiment of the invention, which includes the following steps:

S401: A base station determines an attribute of a UE and assigns the UE with a corresponding data stream.

In the step S401, the base station communicates with the UE and assigns the UE with a corresponding data stream dependent upon an attribute of the UE.

Specifically during downlink MIMO transmission, the eNB assigns each scheduled UE with a specific number of parallel data streams dependent upon a channel condition, a service characteristic, a priority and other factors of each UE, where each data stream is referred to as a layer. In order to support a Spatial Multiplexing technology of at most 8 layers, an 8-port DMRS will be defined in the LTE-A. The MMRS is processed with the same pre-coding as data, and the UE can know an equivalent channel matrix after pre-coding and demodulate the data by measuring the DMRS. The downlink SU-MIMO of the LTE-A can support at most 8 layers, each of which corresponds to a DMRS port. A process flow of a downlink physical channel is as illustrated in FIG. 1.

S402: The base station maps the corresponding data stream from a layer to a corresponding demodulation reference signal port.

S403: The base station transmits data to the UE via the demodulation reference signal port.

In the step S402, the base station maps the corresponding data stream from a layer to a corresponding demodulation reference signal port.

Specifically for downlink transmission at the rank=1, the base station mapping the corresponding data stream from a layer to a corresponding demodulation reference signal port includes:

the corresponding data stream can be mapped onto any port and occupy any CDM group.

Figure 5:
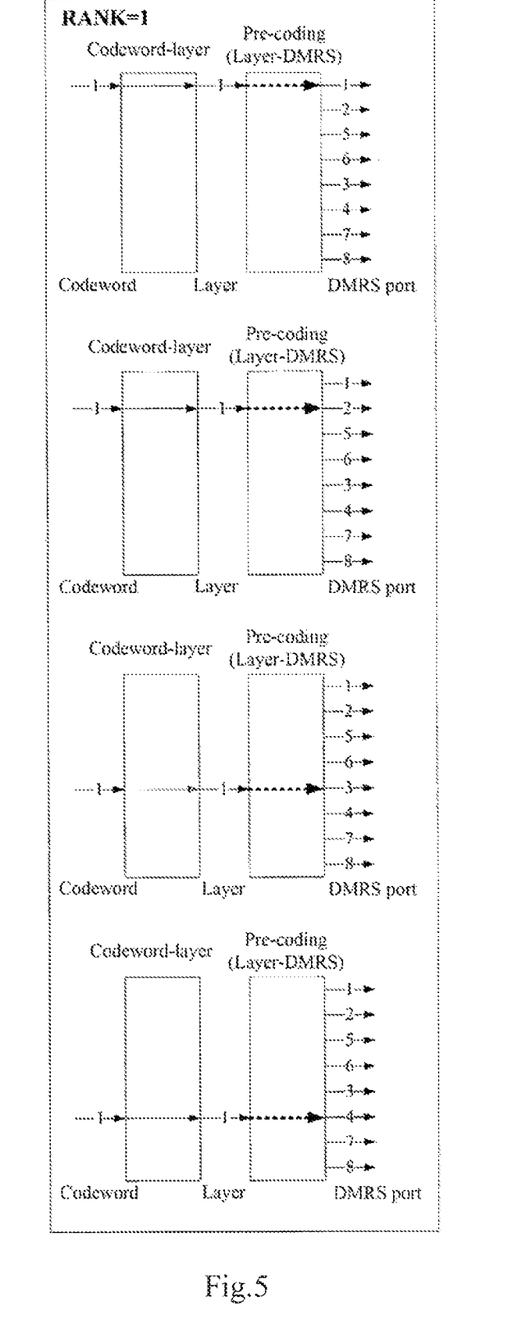
FIG. 5 is a schematic diagram of a layer-to-port mapping relationship at the rank=1 according to an embodiment of the invention.

As illustrated in FIG. 5, for example, assumed Multi-User Multi-Input Multi-Output (MU-MIMO) transmission can be supported with M orthogonal DMRS ports in the LTE-A, and then a data layer can be mapped onto any port in $\{0, \ldots, M\}$ and occupy any CDM group regardless of retransmission or initial transmission. FIG. 5 illustrates a layer-to-port mapping scheme with M=4.

For downlink transmission at the rank=2, the base station mapping the corresponding data stream from a layer to a corresponding demodulation reference signal port includes:

When downlink transmission is double-codeword transmission at the rank=2, DMRS ports to which two layers correspond belong to the same CDM group. For retransmission of a codeword corresponding to the two layers, it is retransmitted in single-codeword transmission, and the ports occupied for the two layers in retransmission belong to the same CDM group.

Figure 6:
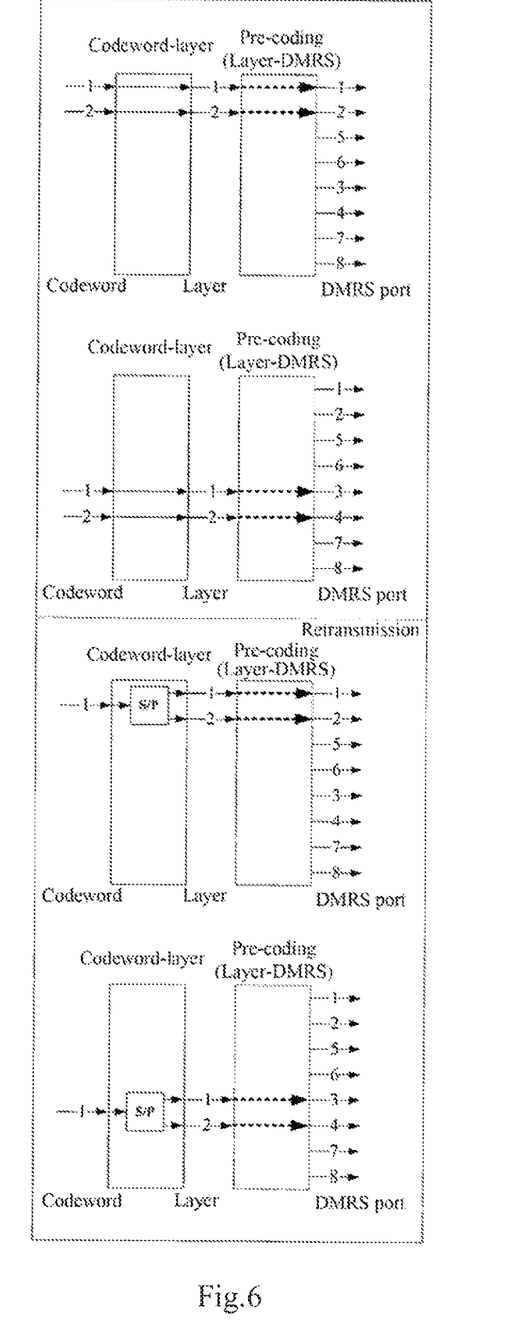
FIG. 6 is a schematic diagram of a layer-to-port mapping relationship at the rank=2 according to an embodiment of the invention.

As illustrated in FIG. 6, for example, in double-codeword transmission at the rank=2. DMRS ports to which two layers correspond shall belong to the same CDM group from the perspective of saving an overhead and improving the reliability of data transmission. A specific group to be occupied is indicated from the eNB side as a result of a scheduling decision.

If double-codeword transmission at the ranks=3-5 were adopted in previous transmission, where a codeword mapped to the layer 2, will be retransmitted and a transport block corresponding to the other codeword will not be retransmitted, then single-codeword transmission will be adopted in this case. DRMS ports to which the two layers correspond shall belong to the same CDM group. A specific group to be occupied is indicated from the eNB side as a result of a scheduling decision. An occupancy condition of ports in retransmission may be inconsistent with that in initial transmission.

Following this mapping relationship, a DMRS overhead is kept at 12 pairs of Res/PRBs, and this mapping scheme is compatible with the Rel-9 to facilitate joint scheduling. FIG. 6 illustrates an example of a layer-to-port mapping relationship in transmission at the rank=2.

For downlink transmission at the rank=3 or the rank=4, the base station mapping the corresponding data stream from a layer to a corresponding demodulation reference signal port includes:

When downlink transmission is double-codeword transmission, a layer to which a codeword 1 corresponds is mapped to a first demodulation reference signal CDM group, and a layer to which a codeword 2 corresponds is mapped to a second demodulation reference signal CDM group.

When downlink transmission is single-codeword transmission, layer-to-demodulation reference signal port mapping is kept consistent with double-codeword transmission.

Figure 7:
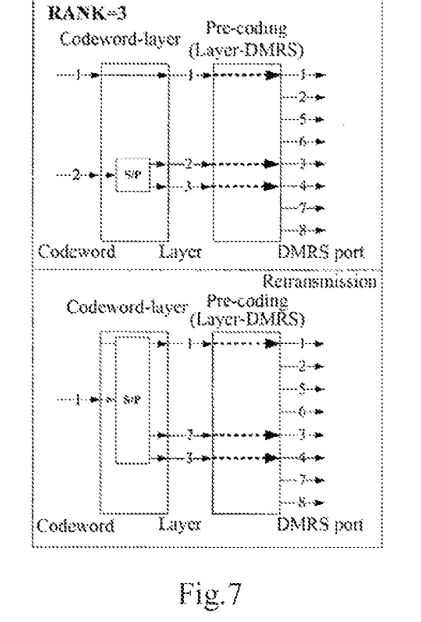
FIG. 7 is a schematic diagram of a layer-to-port mapping relationship at the rank=3 according to an embodiment of the invention.

When downlink transmission is double-codeword transmission at the rank=3, if one of the codewords has an error occurring therewith and will be retransmitted and the other codeword has no new data to be transmitted, then a mapping relationship between the layer to which the retransmitted codeword corresponds and the occupied port thereof is defined as that at the rank=1 or the rank=2. A specific example thereof is as illustrated in FIG. 7.

Figure 8:
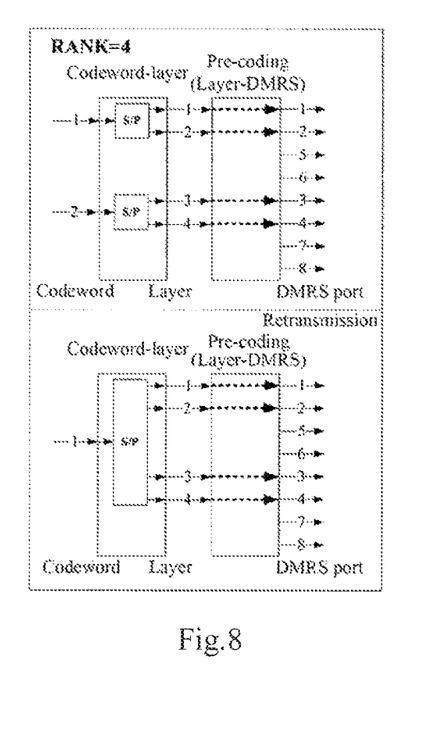
FIG. 8 is a schematic diagram of a layer-to-port mapping relationship at the rank=4 according to an embodiment of the invention.

When downlink transmission is double-codeword transmission at the rank=4, if one of the codewords has an error occurring therewith and will be retransmitted and the other codeword has no new data to be transmitted, then a mapping relationship between the layer to which the retransmitted codeword corresponds and the occupied port thereof is defined as that at the rank=2. A specific example thereof is as illustrated in FIG. 8.

For downlink transmission at the rank=5, 6, 7 or 8, downlink transmission is double-codeword transmission.

For downlink transmission at the rank=5, the base station mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

Figure 9:
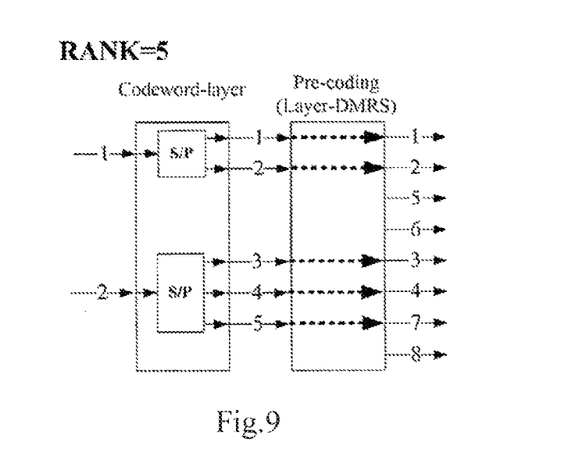
FIG. 9 is a schematic diagram of a layer-to-port mapping relationship at the rank=5 according to an embodiment of the invention.

When downlink transmission is double-codeword transmission at the rank=5, if one of the codewords has an error occurring therewith and will be retransmitted and the other codeword has no new data to be transmitted, then a mapping relationship between the layer to which the retransmitted codeword corresponds and the occupied port thereof is defined as that at the rank=2 or the rank=3. A specific example thereof is as illustrated in FIG. 9.

For downlink transmission at the rank=6, the base station mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

Figure 10:
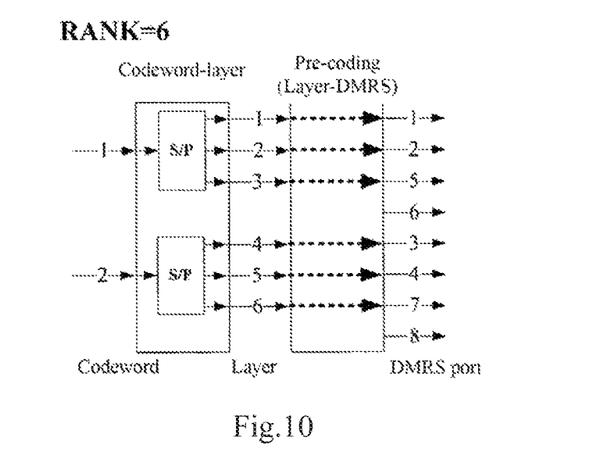
FIG. 10 is a schematic diagram of a layer-to-port mapping relationship at the rank=6 according to an embodiment of the invention.

When downlink transmission is double-codeword transmission at the rank=6, if one of the codewords has an error occurring therewith and will be retransmitted and the other codeword has no new data to be transmitted, then a mapping relationship between the layer to which the retransmitted codeword corresponds and the occupied port thereof is defined as that at the rank=3. A specific example thereof is as illustrated in FIG. 10.

For downlink transmission at the rank=7, the base station mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

Figure 11:
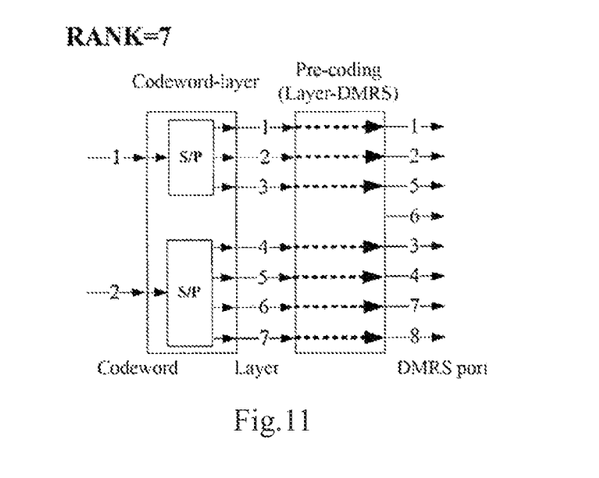
FIG. 11 is a schematic diagram of a layer-to-port mapping relationship at the rank=7 according to an embodiment of the invention.

When downlink transmission is double-codeword transmission at the rank=7, if one of the codewords has an error occurring therewith and will be retransmitted and the other codeword has no new data to be transmitted, then a mapping relationship between the layer to which the retransmitted codeword corresponds and the occupied port thereof is defined as that at the rank=3 or the rank=4. A specific example thereof is as illustrated in FIG. 11.

For downlink transmission at the rank=8, the base station mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

Figure 12:
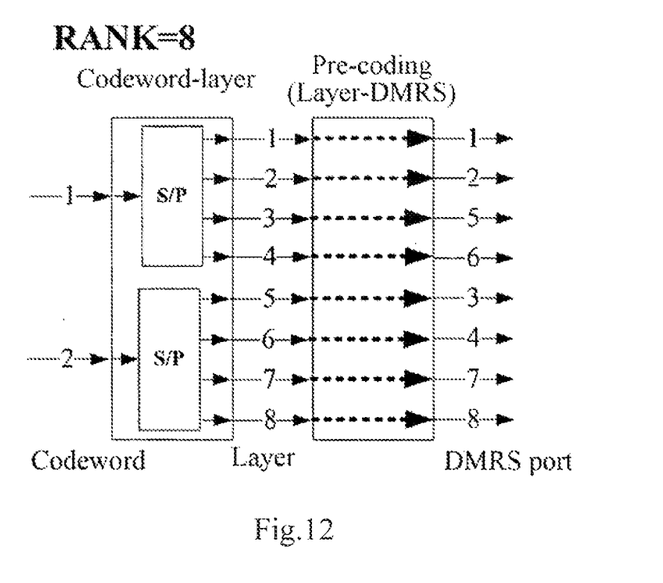
FIG. 12 is a schematic diagram of a layer-to-port mapping relationship at the rank=8 according to an embodiment of the invention.

When downlink transmission is double-codeword transmission at the rank=8, if one of the codewords has an error occurring therewith and will be retransmitted and the other codeword has no new data to be transmitted, then a mapping relationship between the layer to which the retransmitted codeword corresponds and the occupied port thereof is defined as that at the rank=4. A specific example thereof is as illustrated in FIG. 12.

In the step S403, the base station transmits the corresponding data stream to the UE via the demodulation reference signal port determined in the step S402.

The foregoing method proposed according to the embodiment of the invention defines a method of mapping to a demodulation reference signal port at the rank=1 to the rank=8, and a method of mapping to a demodulation reference signal port in retransmission, so that the methods of mapping to a demodulation reference signal port can be compatible with an existing system while keeping a lower demodulation reference signal overhead. Furthermore the foregoing method proposed according to the embodiment of the invention makes minor modification to an existing system without any influence upon continual evolvement of the system and can be simple and efficient to implement.

Figure 13:
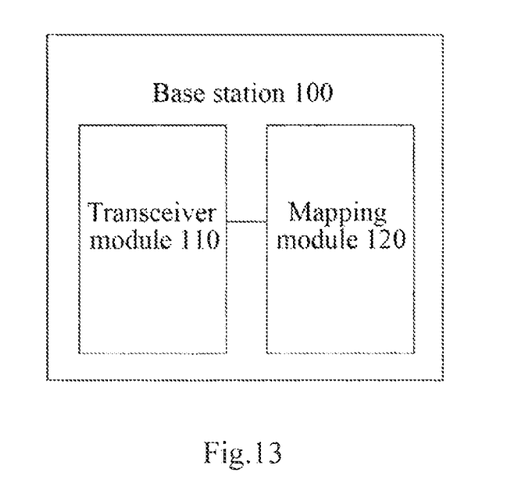
FIG. 13 is a schematic structural diagram of a base station according to an embodiment of the invention.

As illustrated in FIG. 13, an embodiment of the invention further discloses a base station 10 including a transceiver module 110 and a mapping module 120.

Particularly the transceiver module 110 is configured to assign a UE with a corresponding data stream dependent upon an attribute of the UE.

The mapping module 120 is configured to map the corresponding data stream from a layer to a corresponding demodulation reference signal port.

Specifically for downlink transmission at the rank=1, the mapping module 120 mapping the corresponding data stream from a layer to a corresponding demodulation reference signal port includes:

the corresponding data stream can be mapped onto any port and occupy any CDM group.

As illustrated in FIG. 5, for example, assumed MU-MIMO transmission can be supported with M orthogonal DMRS ports in the LTE-A and then a data layer can be mapped onto any port in {0, . . . , M} and occupy any CDM group regardless of retransmission or initial transmission. FIG. 5 illustrates a layer-to-port mapping scheme with M=4.

For downlink transmission at the rank=2, the mapping module 120 mapping the corresponding data stream from a layer to a corresponding demodulation reference signal port includes:

when downlink transmission is double-codeword transmission at the rank=2, DMRS ports to which two layers correspond belong to the same CDM group. For retransmission of a codeword corresponding to the two layers, it is retransmitted in single-codeword transmission, and the ports occupied for the two layers in retransmission belong to the same CDM group.

As illustrated in FIG. 6, for example, in double-codeword transmission at the rank=2, DMRS ports to which two layers correspond shall belong to the same CDM group from the perspective of saving an overhead and improving the reliability of data transmission. A specific group to be occupied is indicated from the eNB side as a result of a scheduling decision.

If double-codeword transmission at the ranks=3-5 were adopted in previous transmission, where a codeword mapped to the layer 2 will be retransmitted and a transport block corresponding to the other codeword will not be retransmitted, then single-codeword transmission will be adopted in this case. DBMS ports to which the two layers correspond shall belong to the same CDM group. A specific group to be occupied is indicated from the eNB side as a result of a scheduling decision. An occupancy condition of ports in retransmission may be inconsistent with that in initial transmission.

Following this mapping relationship, a DMRS overhead is kept at 12 pairs of Res/PRBs, and this mapping scheme is compatible with the Rel-9 to facilitate joint scheduling. FIG. 6 illustrates an example of a layer-to-port mapping relationship in transmission at the rank=2.

For downlink transmission at the rank=3 or the rank=4, the mapping module 120 mapping the corresponding data stream from a layer to a corresponding demodulation reference signal port includes:

When downlink transmission is double-codeword transmission, a layer to which a codeword 1 corresponds is mapped to a first demodulation reference signal CDM group, and a layer to which a codeword 2 corresponds is mapped to a second demodulation reference signal CDM group.

When downlink transmission is single-codeword transmission, layer-to-demodulation reference signal port mapping is kept consistent with double-codeword transmission.

When downlink transmission is double-codeword transmission at the rank=3, if one of the codewords has an error occurring therewith and will be retransmitted and the other codeword has no new data to be transmitted, then a mapping relationship between the layer to which the retransmitted codeword corresponds and the occupied port thereof is defined as that at the rank=1 or the rank=2. A specific example thereof is as illustrated in FIG. 7.

When downlink transmission is double-codeword transmission at the rank=4, if one of the codewords has an error occurring therewith and will be retransmitted and the other codeword has no new data to be transmitted, then a mapping relationship between the layer to which the retransmitted codeword corresponds and the occupied port thereof is defined as that at the rank=2. A specific example thereof is as illustrated in FIG. 8.

For downlink transmission at the rank=5, 6, 7 or 8, downlink transmission is double-codeword transmission.

For downlink transmission at the rank=5, the mapping module 120 mapping the corresponding data stream from a layer to a corresponding demodulation reference signal port includes:

A layer to which a codeword 1 corresponds is mapped to a first demodulation reference signal CDM group, and a layer to which a codeword 2 corresponds is mapped to a second demodulation reference signal CDM group.

When downlink transmission is double-codeword transmission at the rank=5, if one of the codewords has an error occurring therewith and will be retransmitted and the other codeword has no new data to be transmitted, then a mapping relationship between the layer to which the retransmitted codeword corresponds and the occupied port thereof is defined as that at the rank=2 or the rank=3. A specific example thereof is as illustrated in FIG. 9.

For downlink transmission at the rank=6, the mapping module 120 mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

When downlink transmission is double-codeword transmission at the rank=6, if one of the codewords has an error occurring therewith and will be retransmitted and the other codeword has no new data to be transmitted, then a mapping relationship between the layer to which the retransmitted codeword corresponds and the occupied port thereof is defined as that at the rank=3. A specific example thereof is as illustrated in FIG. 10.

For downlink transmission at the rank=7, the mapping module 120 mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

When downlink transmission is double-codeword transmission at the rank=7, if one of the codewords has an error occurring therewith and will be retransmitted and the other codeword has no new data to be transmitted, then a mapping relationship between the layer to which the retransmitted codeword corresponds and the occupied port thereof is defined as that at the rank=3 or the rank=4. A specific example thereof is as illustrated in FIG. 11.

For downlink transmission at the rank=8, the mapping module 120 mapping the corresponding data stream from a layer to a corresponding demodulation reference signal port includes:

a layer to which a codeword 1 corresponds is mapped to a first demodulation reference signal CDM group, and a layer to which a codeword 2 corresponds is mapped to a second demodulation reference signal CDM group.

When downlink transmission is double-codeword transmission at the rank=8, if one of the codewords has an error occurring therewith and will be retransmitted and the other codeword has no new data to be transmitted, then a mapping relationship between the layer to which the retransmitted codeword corresponds and the occupied port thereof is defined as that at the rank=4. A specific example thereof is as illustrated in FIG. 12.

Thereafter the transceiver module 110 is further configured to transmit the corresponding data stream to the UE via the demodulation reference signal port determined by the mapping module 120.

The foregoing apparatus proposed according to the embodiment of the invention defines an apparatus for mapping to a demodulation reference signal port at the rank=1 to the rank=8, and an apparatus for mapping to a demodulation reference signal port in retransmission, so that the apparatus for mapping to a demodulation reference signal port can be compatible with an existing system while keeping a lower demodulation reference signal overhead. Furthermore the foregoing apparatus proposed according to the embodiment of the invention makes minor modification to an existing system without any influence upon continual evolvement of the system and can be simple and efficient to implement.

Those ordinarily skilled in the art can appreciate that a part or all of the steps in the method according to the embodiment described above can be perform in a program instructing relevant hardware, which can be stored in a computer readable storage medium and which upon execution includes one or a combination of the steps in the method embodiment.

Furthermore the respective functional units in the respective embodiments of the invention can be integrated in a processing module or the respective units can physically exist separately or two or more of the units can be integrated in a module. The integrated module can be embodied in the form of hardware or in the form of a software functional module. The integrated module can also be stored in a computer readable storage medium if it is embodied in the form of a software functional module and sold or used as a standalone product.

The storage medium mentioned above can be a read only memory, a magnetic disk, an optical disk, etc.

The foregoing description is illustrative of the preferred embodiments of the invention, and it shall be noted that those ordinarily skilled in the art can further make several adaptations and modifications without departing from the principal of the invention and these adaptations and modifications shall also be construed as falling into the scope of the invention.

The invention claimed is:

1. A method of mapping to a demodulation reference signal port, comprising:

assigning, by a base station, a User Equipment, UE, with a corresponding data stream dependent upon an attribute of the UE;

mapping, by the base station, the corresponding data stream from a layer to a corresponding demodulation reference signal port dependent upon a value of a rank; and transmitting, by the base station, the corresponding data stream to the UE via the demodulation reference signal port;

wherein for downlink transmission at the rank=2, mapping, by the base station, the corresponding data stream from the layer to the corresponding demodulation reference signal port comprises: when downlink transmission is double-codeword transmission at the rank=2, the base station maps two layers to two demodulation reference signal ports belonging to a same code division multiplexing (CDM) group.

2. The method of mapping to a demodulation reference signal port according to claim 1, wherein for downlink transmission at the rank=1, mapping, by the base station, the corresponding data stream from a layer to a corresponding demodulation reference signal port comprises:

mapping the corresponding data stream onto any port and occupying any CDM group.

3. The method of mapping to a demodulation reference signal port according to claim 1, wherein for retransmission of the same codeword corresponding to the two layers, it is retransmitted in single-codeword transmission, and the ports occupied for the two layers in retransmission belong to the same CDM group.

4. The method of mapping to a demodulation reference signal port according to claim 1, wherein for downlink transmission at the rank=3 or the rank=4, mapping, by the base station, the corresponding data stream from a layer to a corresponding demodulation reference signal port comprises:

when downlink transmission is double-codeword transmission, mapping the layer, to which a codeword 1 corresponds, to a first demodulation reference signal CDM group, and mapping the layer, to which a codeword 2 corresponds, to a second demodulation reference signal CDM group; and when downlink transmission is single-codeword transmission, keeping layer-to-demodulation reference signal port mapping consistent with double-codeword transmission.

5. The method of mapping to a demodulation reference signal port according to claim 4, wherein when downlink transmission is double-codeword transmission at the rank=3, if one of the codewords has an error occurring therewith and will be retransmitted and the other codeword has no new data to be transmitted, then a mapping relationship between the layer to which the retransmitted codeword corresponds and the occupied port thereof is defined as that at the rank=1 or the rank=2.

6. The method of mapping to a demodulation reference signal port according to claim 4, wherein when downlink transmission is double-codeword transmission at the rank=4, if one of the codewords has an error occurring therewith and will be retransmitted and the other codeword has no new data to be transmitted, then a mapping relationship between the layer to which the retransmitted codeword corresponds and the occupied port thereof is defined as that at the rank=2.

7. The method of mapping to a demodulation reference signal port according to claim 1, wherein for downlink transmission at the rank=5, the rank=6, the rank=7 or the rank=8, mapping, by the base station, the corresponding data stream from a layer to a corresponding demodulation reference signal port comprises:

mapping the layer, to which a codeword 1 corresponds, to a first demodulation reference signal CDM group, and mapping the layer, to which a codeword 2 corresponds, to a second demodulation reference signal CDM group.

8. The method of mapping to a demodulation reference signal port according to claim 7, wherein when downlink transmission is double-codeword transmission at the rank=5, if one of the codewords has an error occurring therewith and will be retransmitted and the other codeword has no new data to be transmitted, then a mapping relationship between the layer to which the retransmitted codeword corresponds and the occupied port thereof is defined as that at the rank=2 or the rank=3.

9. The method of mapping to a demodulation reference signal port according to claim 7, wherein when downlink transmission is double-codeword transmission at the rank=6, if one of the codewords has an error occurring therewith and will be retransmitted and the other codeword has no new data to be transmitted, then a mapping relationship between the layer to which the retransmitted codeword corresponds and the occupied port thereof is defined as that at the rank=3.

10. The method of mapping to a demodulation reference signal port according to claim 7, wherein when downlink transmission is double-codeword transmission at the rank=7, if one of the codewords has an error occurring therewith and will be retransmitted and the other codeword has no new data to be transmitted, then a mapping relationship between the layer to which the retransmitted codeword corresponds and the occupied port thereof is defined as that at the rank=3 or the rank=4.

11. The method of mapping to a demodulation reference signal port according to claim 7, wherein when downlink transmission is double-codeword transmission at the rank=8, if one of the codewords has an error occurring therewith and will be retransmitted and the other codeword has no new data to be transmitted, then a mapping relationship between the layer to which the retransmitted codeword corresponds and the occupied port thereof is defined as that at the rank=4.

12. A base station, comprising a transceiver and a processor, wherein:
the transceiver is configured to assign a User Equipment, UE, with a corresponding data stream dependent upon an attribute of the UE;
the processor is configured to map the corresponding data stream from a layer to a corresponding demodulation reference signal port dependent upon a value of a rank; and
the transceiver is further configured to transmit the corresponding data stream to the UE via the demodulation reference signal port;
wherein for downlink transmission at the rank=2, the processor mapping the corresponding data stream from a layer to a corresponding demodulation reference signal port comprises: when downlink transmission is double-codeword transmission at the rank=2, the processor maps two layers to two demodulation reference signal ports belonging to a same code division multiplexing (CDM) group.

13. The base station according to claim 12, wherein for downlink transmission at the rank=1, the processor mapping the corresponding data stream from a layer to a corresponding demodulation reference signal port comprises:
mapping the corresponding data stream onto any port and occupying any CDM group.

14. The base station according to claim 12, wherein for retransmission of a codeword corresponding to the two layers, it is retransmitted in single-codeword transmission, and the ports occupied for the two layers in retransmission belong to the same CDM group.

15. The base station according to claim 12, wherein for downlink transmission at the rank=3 or the rank=4, the processor mapping the corresponding data stream from a layer to a corresponding demodulation reference signal port comprises:
when downlink transmission is double-codeword transmission, mapping the layer, to which a codeword 1 corresponds, to a first demodulation reference signal CDM group, and mapping the layer, to which a codeword 2 corresponds, to a second demodulation reference signal CDM group; and
when downlink transmission is single-codeword transmission, keeping layer-to-demodulation reference signal port mapping consistent with double-codeword transmission,
wherein when downlink transmission is double-codeword transmission at the rank=3, if one of the codewords has an error occurring therewith and will be retransmitted and the other codeword has no new data to be transmitted, then a mapping relationship between the layer to which the retransmitted codeword corresponds and the occupied port thereof is defined as that at the rank=1 or the rank=2; or
when downlink transmission is double-codeword transmission at the rank=4, if one of the codewords has the error occurring therewith and will be retransmitted and the other codeword has no new data to be transmitted, then the mapping relationship between the layer to which the retransmitted codeword corresponds and the occupied port thereof is defined as that at the rank=2.

16. The base station according to claim 12, wherein for downlink transmission at the rank=5, the rank=6, the rank=7 or the rank=8, the processor mapping the corresponding data stream from a layer to a corresponding demodulation reference signal port comprises:
mapping the layer, to which a codeword 1 corresponds, to a first demodulation reference signal CDM group, and mapping the layer, to which a codeword 2 corresponds, to a second demodulation reference signal CDM group,
wherein when downlink transmission is double-codeword transmission at the rank=5, if one of the codewords has an error occurring therewith and will be retransmitted and the other codeword has no new data to be transmitted, then a mapping relationship between the layer to which the retransmitted codeword corresponds and the occupied port thereof is defined as that at the rank=2 or the rank=3; or
when downlink transmission is double-codeword transmission at the rank=6, if one of the codewords has the error occurring therewith and will be retransmitted and the other codeword has no new data to be transmitted, then the mapping relationship between the layer to which the retransmitted codeword corresponds and the occupied port thereof is defined as that at the rank=3; or
when downlink transmission is double-codeword transmission at the rank=7, if one of the codewords has the error occurring therewith and will be retransmitted and the other codeword has no new data to be transmitted, then the mapping relationship between the layer to which the retransmitted codeword corresponds and the occupied port thereof is defined as that at the rank=3 or the rank=4; or
when downlink transmission is double-codeword transmission at the rank=8, if one of the codewords has the error occurring therewith and will be retransmitted and the other codeword has no new data to be transmitted, then the mapping relationship between the layer to which the retransmitted codeword corresponds and the occupied port thereof is defined as that at the rank=4.

* * * * *